United States Patent
Ikari

(10) Patent No.: US 11,673,838 B2
(45) Date of Patent: Jun. 13, 2023

(54) TRANSPARENT SPINEL SINTERED BODY, OPTICAL MEMBER AND METHOD FOR PRODUCING TRANSPARENT SPINEL SINTERED BODY

(71) Applicant: Shin-Etsu Chemical Co., Ltd., Tokyo (JP)

(72) Inventor: Masanori Ikari, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1075 days.

(21) Appl. No.: 16/338,751

(22) PCT Filed: Oct. 5, 2017

(86) PCT No.: PCT/JP2017/036237
§ 371 (c)(1),
(2) Date: Apr. 2, 2019

(87) PCT Pub. No.: WO2018/066636
PCT Pub. Date: Apr. 12, 2018

(65) Prior Publication Data
US 2021/0292241 A1    Sep. 23, 2021

(30) Foreign Application Priority Data
Oct. 5, 2016   (JP) .............................. JP2016-196929

(51) Int. Cl.
*C04B 35/443*   (2006.01)
*C04B 35/626*   (2006.01)
(Continued)

(52) U.S. Cl.
CPC ........ *C04B 35/443* (2013.01); *C04B 35/6261* (2013.01); *C04B 35/6455* (2013.01);
(Continued)

(58) Field of Classification Search
CPC ............. C04B 35/443; C04B 35/6261; C04B 35/6455; G02B 1/02
See application file for complete search history.

(56) References Cited

U.S. PATENT DOCUMENTS 4,543,346 A * 9/1985 Matsui ................ C04B 35/6262
501/153
4,930,731 A   6/1990 Roy et al.
(Continued)

FOREIGN PATENT DOCUMENTS

EP    2 112 127 A1   10/2009
JP    2008-81377 A    4/2008
(Continued)

OTHER PUBLICATIONS

International Search Report dated Dec. 26, 2017, issued in counterpart International Application No. PCT/JP2017/036237, with English Translation. (4 pages).

*Primary Examiner* — James A Fiorito
(74) *Attorney, Agent, or Firm* — WHDA, LLP

(57) ABSTRACT

Provided is a transparent spinel sintered body which is formed from an Mg—Al spinel powder having an Al/Mg ratio of from 1.97 to 2.03 or a mixed powder of an Mg oxide and an Al oxide, and wherein the total content of metal impurities excluding Al and Mg is less than 100 ppm. A sample of this transparent spinel sintered body having a thickness of 3 mm has a total light transmittance of 80% or more in the thickness direction for the wavelength range of from 190 nm to 400 nm; and this transparent spinel sintered body is usable as a medium that transmits light from an ultraviolet light emitting element.

16 Claims, 2 Drawing Sheets

(51) Int. Cl.
*C04B 35/645* (2006.01)
*G02B 1/02* (2006.01)

(52) U.S. Cl.
CPC ........ *G02B 1/02* (2013.01); *C04B 2235/3206* (2013.01); *C04B 2235/3217* (2013.01); *C04B 2235/5409* (2013.01); *C04B 2235/5445* (2013.01); *C04B 2235/5454* (2013.01); *C04B 2235/604* (2013.01); *C04B 2235/658* (2013.01); *C04B 2235/72* (2013.01); *C04B 2235/9653* (2013.01)

(56) References Cited

U.S. PATENT DOCUMENTS

| | | | |
|---|---|---|---|
| 5,001,093 A | * | 3/1991 | Roy .................. H01Q 1/42 501/153 |
| 2010/0103356 A1 | | 4/2010 | Yoshimura et al. |
| 2011/0143911 A1 | | 6/2011 | Menke et al. |
| 2012/0093713 A1 | | 4/2012 | Yoshimura et al. |

FOREIGN PATENT DOCUMENTS

| | | | |
|---|---|---|---|
| JP | 2008-98217 | A | 4/2008 |
| JP | 4502748 | B2 | 7/2010 |
| JP | 4830911 | A | 12/2011 |
| JP | 5435397 | A | 3/2014 |
| JP | 2014-102485 | A | 6/2014 |
| JP | 5563766 | B2 | 7/2014 |
| JP | 2015-61813 | A | 4/2015 |
| JP | 2016-6832 | A | 1/2016 |
| JP | 2016-49519 | A | 4/2016 |
| WO | 2009/128269 | A1 | 10/2009 |

* cited by examiner

TRANSPARENT SPINEL SINTERED BODY, OPTICAL MEMBER AND METHOD FOR PRODUCING TRANSPARENT SPINEL SINTERED BODY

TECHNICAL FIELD

This invention relates to a transparent spinel sintered body serving as a UV light transmissive medium for use in applied products utilizing UV light-emitting diode chips (UV-LED chips), an optical member, and a method for producing the transparent spinel sintered body.

BACKGROUND ART

UV light sources are increasingly utilized in a variety of fields including resin curing, bonding, decomposition of chemicals, medical treatment, sterilization and inspection. With the recent advent of light sources of light-emitting diode (LED) type, it is expected that the widespread use of UV light sources is further promoted.

However, in the sterilization field where UV light of wavelength 250 to 280 nm (light of ultraviolet wavelength or UV light), so-called UV-C must be irradiated in order to break DNA chains of bacterial cells, there is the problem that prior art optical members for blue LEDs cannot be used because of poor UV resistance.

Then, several UV light transmissive media having UV resistance have been proposed as the UV-LED optical member.

For example, JP-A 2016-006832 (Patent Document 1) discloses an optical element formed of a thermoplastic perfluoro-resin, having a lens shape on one surface and a convex shape pairing with the lens shape on another surface, the convex shape being configured such that the open area decreases from the surface opening to the inside of the concave. It also discloses a UV-LED element package comprising a substrate, a light-emitting element joined to the substrate, an encapsulation layer encapsulating the light-emitting element joined to the substrate, and an optical element disposed on the encapsulation layer and having a lens shape on one surface, wherein the encapsulation layer and the optical element are formed using a thermoplastic perfluoro-resin, the encapsulation layer is in close contact with the other surface of the optical element at least in a region where the lens shape is formed.

This proposal, however, has the problem that the perfluoro-resin is generally difficult to directly bond to semiconductor elements, metal electrodes, ceramic substrates and the like, and the resin will readily separate off during service.

Also, JP-A 2016-049519 (Patent Document 2) discloses a UV sterilization device wherein UV radiation having a sterilization action is irradiated to an objective fluid in the form of and aqueous fluid for achieving sterilization of the fluid. In its specification, inorganic materials such as sapphire, natural or synthetic quartz, calcium fluoride, magnesium fluoride and glass, and fluoro-resins such as PFA, FEP, ETFE, and PCTFE are disclosed as the window material which is transmissive to UV.

However, single crystal sapphire has the problem that it is too hard and difficult to machine to such a shape as lens shape. Quartz glass has the problem that insufficient heat dissipation due to a thermal conductivity as low as 1 W/m·k causes the chip to degrade. Calcium fluoride has the problem that the difficulty of stable supply limits its application to low-volume special applications like telescope lenses. Magnesium fluoride has the problem that the design of luminous intensity distribution is difficult because of birefringence. Ordinary glass has the problem that it absorbs light of the UV region and is inferior in transmittance and long-term stability. These problems prevent the widespread use.

From the past, spinel materials are known as one group of light-transmitting materials. For example, single crystal spinel is transmissive to UV as long as its crystal quality is good, and expected to find application as the window material for UV-LEDs. However, the growth of single crystal spinel is actually difficult. Only an ingot of about 1.5 inches is pulled up. Many regions of the pulled-up ingot contain defects like stria. It is difficult to produce a large number of ingots for UV transmitting members.

Then spinel materials of polycrystalline sintered body type are also developed. For example, JP 5435397 (Patent Document 3) discloses a light transmitting window material in the form of a spinel sintered body ($MgO \cdot nAl_2O_3$), wherein pores contained therein have a maximum diameter of up to 100 μm, and the number of pores having a maximum diameter of at least 10 μm is up to 2.0 pores per cm$^3$ of the window material. Allegedly, light scattering factors are reduced and mechanical strength is improved.

However, the text of Patent Document 3 refers to only a high transmittance of light in the region from visible light to intermediate IR, but not to the transmittance in the UV region. In the text of Patent Document 3, the spinel from which a spinel sintered body is formed is preferably a compound having the molecular formula: $MgO \cdot nAl_2O_3$ wherein n has a value of 1.05 to 1.30.

Also, JP 4830911 (Patent Document 4) discloses a spinel sintered body of the composition: $MgO \cdot nAl_2O_3$ wherein $1.05 \leq n \leq 1.30$, having a Si content of from 3 ppm to 20 ppm, the sintered body exhibiting improved transparency and stability thereof.

However, the sintered bodies of Patent Documents 3 and 4 have an Al/Mg ratio of 2.1 to 2.6, suggesting that $Al_2O_3$ is richer than MgO. In the case of an Al—Mg spinel sintered body, as the proportion of $Al_2O_3$ relative to MgO increases, the material is more effectively sintered and transparentized. On the contrary, there is the propensity that nonstoichiometric defects (like stacking faults) gradually increase, and the transmittance of the overall sintered body gradually decreases. In particular, an outstanding drop of transmittance occurs in the UV region of wavelength 200 nm and shorter, raising the problem of difficult utilization in the UV-C region.

Also, JP-A 2015-061813 (Patent Document 5) discloses an optoceramic comprising crystallites of the formula AxCuByDvEzFw, wherein A and C are selected from the group consisting of $Mg^{2+}$, $Ca^{2+}$, $Sr^{2+}$, $Ba^{2+}$, $Sc^{3+}$, $Zn^{2+}$, $Cd^{2+}$, $Hf^{4+}$ and mixtures thereof, B and D are selected from the group consisting of $Mg^{2+}$, $Al^{3+}$, $Ga^{3+}$, $In^{3+}$, $Sc^{3+}$, $Zn^{2+}$, $Y^{3+}$, $Nb^{3+}$, $Ru^{3+}$, $Rh^{3+}$, $La^{3+}$, $Gd^{3+}$ and mixtures thereof, E and F are selected mainly from the group consisting of the divalent anions of S, Se and O and mixtures thereof, x, u, y, v, z and w satisfy the formulae:

$0.125 < (x+u)/(y+v) \leq 0.55$ and $z+w=4$ and at least 95% by weight of the crystallites display symmetric, cubic crystal structures of the spinel type, with the proviso that when $A=C=Mg^{2+}$ and $B=D=Al^{3+}$, E and F cannot both be O, wherein at least 95% by weight of said crystallites display symmetric, cubic crystal structures of the spinel type, and said optoceramic has a linear transmittance in excess of 95% in a window having a width of at least 200 nm in the region of visible light having wavelengths from 380 nm to 800 nm at a sample thickness of 2 mm. There is provided a material having a high refractive index, high Abbe constant and/or improved specific relative partial dispersion, and low stress-induced birefringence.

However, Patent Document 5 refers to only the spinel type optoceramic which has a high transmission in the visible spectral region (from 380 to 800 nm) and in the near IR to far IR spectral region of up to 5,000 nm, but not the transmittance in the UV region.

Under the circumstances, recently JP 5563766 (Patent Document 6) discloses a transparent spinel ceramic characterized by: (1) having a crystal structure consisting essentially of spinel cubic crystals, (2) having an average crystal grain size in the range of 5 to 250 µm, (3) a sample with a thickness of 10 mm having a linear transmittance of at least 70% at a base line of light transmission at wavelengths of 600 nm and 3,200 nm in a thickness direction of the sample, (4) an Al/Mg atomic ratio of 2.3 to 1.95 throughout the ceramic, (5) containing 0.1 to 1.5% by weight of at least one fluoride selected from $MgF_2$ and $AlF_3$, and (6) containing $MgF_2$ and $AlF_3$ in a $MgF_2/AlF_3$ weight ratio in the range of 0.2 to 5.0. Even the sample with a thickness of 10 mm exhibits a light transmittance of at least 50% in the UV region of 200 nm.

Patent Document 6 describes a known example using a transparent spinel ceramic and having a certain degree of light transmission even in the UV region of 200 nm, so that its use as a UV transmitting member is expectable. However, a precise study reveals that the relevant material involves one significant problem, namely, the addition of at least 0.1% by weight of $MgF_2$ and $AlF_3$. It is seen that in an example exhibiting good light transmission in the UV region of 200 nm, the contents of $MgF_2$ and $AlF_3$ added are each as high as 0.3% by weight (3,000 ppm).

In general, $MgF_2$ and $AlF_3$ are known to be non-absorptive over a wide range from the UV region to the IR region. Notably, these materials have crystal structures other than cubic ($MgF_2$ is tetragonal and $AlF_3$ is triclinic), and possess several drawbacks such as the presence of birefringence, a substantial lowering of linear transmittance, and a substantial drop of strength associated with their incorporation in an oxide sintered body as a heterogeneous phase. A review on the text of Patent Document 6 reveals that $MgF_2$ and $AlF_3$ are added to a spinel raw material for the purpose of drastically reducing residual pores which act as a scattering source. Despite the advantage of reduced residual pores, the addition of noticeable amounts of heterogeneous phases ($MgF_2$ and $AlF_3$) inviting various drawbacks fails to reach industrially acceptable UV transmitting members.

PRIOR ART DOCUMENTS

Patent Documents

Patent Document 1: JP-A 2016-006832
Patent Document 2: JP-A 2016-049519
Patent Document 3: JP 5435397
Patent Document 4: JP 4830911
Patent Document 5: JP-A 2015-061813
Patent Document 6: JP 5563766

SUMMARY OF INVENTION

Technical Problem

An object of the invention, which has been made under the above-mentioned circumstances, is to provide a transparent spinel sintered body utilizable as a medium for transmitting light from a UV light-emitting chip, an optical member, and a method for producing the transparent spinel sintered body.

Solution to Problem

To attain the above object, the invention provides a transparent spinel sintered body, an optical member, and a method for producing a transparent spinel sintered body, as defined below.

[1] A transparent spinel sintered body which is formed from an Mg—Al spinel powder or a mixed powder of Mg oxide and Al oxide having an Al/Mg ratio of 1.97 to 2.03, wherein the total content of metal impurities excluding Al and Mg is less than 100 ppm, and a sample of the sintered body with a thickness of 3 mm has an overall light transmittance in thickness direction of at least 80% over the wavelength range of from 190 nm to 400 nm.

[2] The transparent spinel sintered body of [1] wherein the total content of C, N, F, S and P is less than 100 ppm.

[3] The transparent spinel sintered body of [1] or [2] which contains microbubbles capable of internally scattering incident ultraviolet light without absorption.

[4] The transparent spinel sintered body of any one of [1] to [3] which has a thermal conductivity in excess of 10 W/m·K.

[5] The transparent spinel sintered body of any one of [1] to [4] which has a refractive index of from 1.7 to 2.0 at wavelength 190 to 400 nm.

[6] An optical member comprising the transparent spinel sintered body of any one of [1] to [5], the optical member being disposed on the emergent side of a UV light-emitting chip capable of emitting light of wavelength up to 400 nm and serving as a medium for transmitting light from the UV light-emitting chip.

[7] The optical member of [6] wherein the UV light-emitting chip is a UV light-emitting diode chip capable of emitting light in at least any one wavelength region selected from UV-A region of wavelength 315 to 400 nm, UV-B region of wavelength 280 to 315 nm, and UV-C region of wavelength 100 to 280 nm.

[8] The optical member of [6] or [7] which is bonded to the UV light-emitting chip with an inorganic oxide adhesive.

[9] The optical member of any one of [6] to [8] wherein an emergent surface of the member for light to be transmitted has a spherical or aspheric lens shape, an array structure having spherical or aspheric lenses disposed in array, or a texture structure consisting of microscopic irregularities or microscopic pyramids.

[10] A method for preparing the transparent spinel sintered body of any one of [1] to [5], comprising the steps of furnishing as a starting raw material, an Mg—Al spinel powder or a mixed powder of Mg oxide and Al oxide having a purity of at least 4N, a BET specific surface area of 10 to 25 m²/g, an average primary particle size of 80 to 200 nm, and an Al/Mg ratio of 1.97 to 2.03, firing the starting raw material in an oxygen-containing to atmosphere without adding a sintering aid to the raw material, grinding the fired material into a source powder, filling a mold with the source powder, pressure molding the source powder into a compact, and sintering the compact.

[11] The method of [10] wherein the firing temperature is 700 to 950° C. when the starting raw material is an Mg—Al spinel powder, or 800 to 1,100° C. when the starting raw material is a mixed powder of Mg oxide and Al oxide.

[12] The method of [10] or [11] wherein the source powder after the firing and grinding steps has a BET specific surface area of 10 to 14 m$^2$/g.

Advantageous Effects of Invention

According to the invention, there is obtained a UV-transmissive member of industrially acceptable high level suited for use with UV light-emitting chips, featuring inhibited absorption in the full range of UV wavelength region from wavelength 190 nm to 400 nm, an overall light transmittance of at least 80% in the range, an ability to be directly bonded to a UV light-emitting chip with an inorganic oxide adhesive having UV resistance, the elimination of a heterogeneous phase having a birefringent component, and a high thermal conductivity in excess of 10 W/m·K.

DESCRIPTION OF EMBODIMENTS

Figure 1:
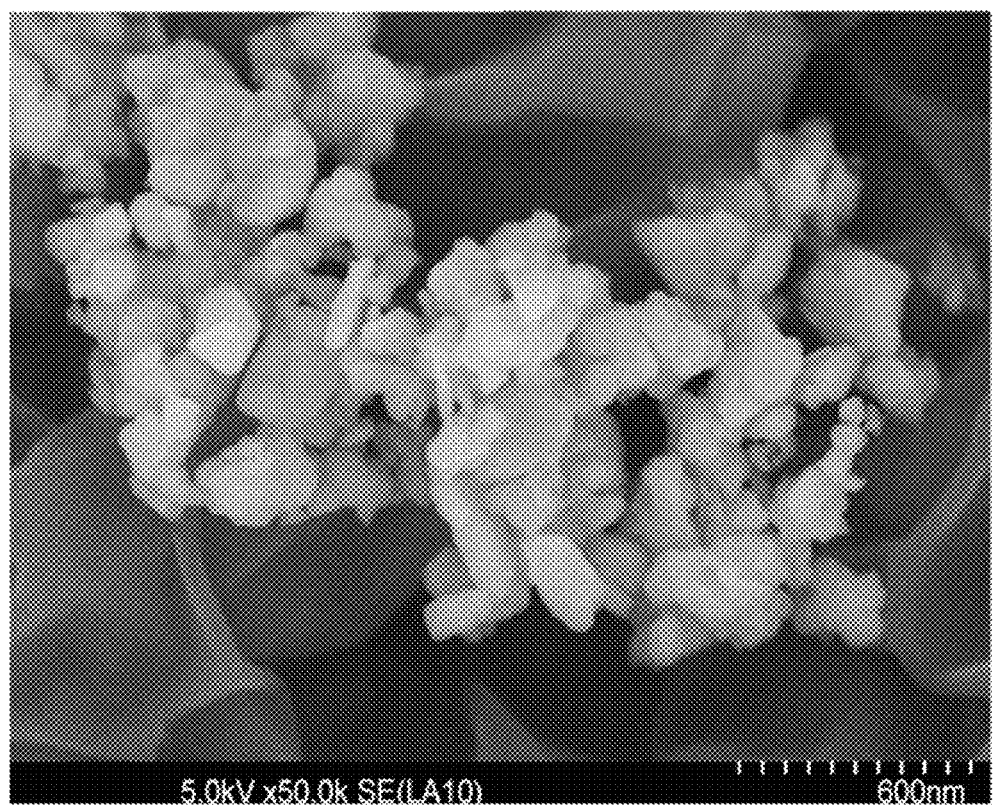
FIG. 1 is an electron microscope image of the spinel source powder used in Example 1-1, obtained by firing a starting raw material and then grinding.

[Transparent Spinel Sintered Body]
Now the transparent spinel sintered body of the invention is described.
The transparent spinel sintered body of the invention is a spinel sintered body which is formed from an Mg—Al spinel powder or a mixed powder of Mg oxide and Al oxide having an Al/Mg ratio (atomic ratio, same hereinafter) of 1.97 to 2.03, i.e., a polycrystalline sintered body composed of a multiplicity of sintered grains of Mg—Al spinel type complex oxide having an Al/Mg ratio of 1.97 to 2.03. Also, the Mg—Al spinel sintered body is characterized in that the total content of metal impurities excluding Al and Mg is less than 100 ppm, it is transmissive to UV light, and a sample of the sintered body with a thickness of 3 mm has an overall light transmittance in thickness direction of at least 80% in the wavelength range of from 190 nm to 400 nm. It is noted that when the numerical range is depicted as "(from) A to B", a range of at least A and up to B is meant and inclusive of the endpoints. As used herein, ppm is parts by weight per million parts by weight.
Most preferably, the Mg—Al spinel sintered body has an Al/Mg atomic ratio of 2.00 corresponding to the stoichiometric coefficient (i.e., MgAl$_2$O$_4$). A spinel of a non-stoichiometric composition deviating from this ratio has the risk that point defects are introduced in proportion to the magnitude of deviation. Then the invention uses an Mg—Al spinel powder or a mixed powder of Mg oxide and Al oxide having an Al/Mg ratio of from 1.97 to 2.03. As long as the Al/Mg ratio is in the range, substantially no absorption by nonstoichiometric defects occurs and high transmission to UV light is available.
When the sintered body has an Al/Mg ratio in the range of from 1.97 to 2.03, its structure contains MgAl$_2$O$_4$ type spinel cubic crystals as the major phase, preferably consists of spinel cubic crystals. Notably, the structure containing spinel cubic crystals as the major phase means that spinel cubic crystals account for at least 90% by volume, preferably at least 95% by volume, more preferably at least 99% by volume, even more preferably at least 99.9% by volume, most preferably 100% by volume of the overall crystal structure. The cubic crystal structure is preferred because the influence of scattering due to birefringence is eliminated and in particular, the overall light transmittance in the UV wavelength region is improved.

It is noted that when the transparent spinel sintered body of the invention is produced, the starting raw material which is weighed and prepared while aiming at an Al/Mg ratio of 2.00 is preferably used. In this case, there may be used either a spinel raw material powder (MgAl$_2$O$_4$ powder) which is calcined while aiming at an Al/Mg ratio of 2.00, or a mixed raw material which is prepared by weighing an Al oxide powder (Al$_2$O$_3$ powder) and an Mg oxide powder (MgO powder) so as to meet an Al/Mg ratio of 2.00, mixing them and calcining the mixture.

Independent of whether the MgAl$_2$O$_4$ raw material powder or the mixed raw material of Al$_2$O$_3$ powder and MgO powder is used, a purity of at least 99.99% by weight (4N) is essential for avoiding absorption of light in the UV region. Namely, the transparent spinel sintered body of the invention is constructed as a sintered body composed mainly of cubic MgAl$_2$O$_4$ spinel which is obtained by sintering a raw material having a purity of at least 4N.

As long as the starting raw material having a purity of at least 4N is used, and a raw material containing other metal components (sintering aid or the like) is not added besides, it is possible that the total concentration (or total content) of metal impurities exclusive of Mg and Al in the sintered body, especially the concentration of Li impurity is managed to be less than 100 ppm. Differently stated, other elements may be contained in an amount of up to the level to constitute the balance of purity 4N. The other elements include, in most cases, impurity elements incidentally introduced in the course of preparation. Typically calcium (Ca), silicon (Si), iron (Fe), yttrium (Y), zirconium (Zr), tungsten (Ta) and molybdenum (Mo) are exemplified as the group of various impurities.

The content of other elements is preferably up to 0.01 part by weight, calculated as the weight of oxides of other elements, more preferably up to 0.001 part by weight (substantially 0), provided that the total amount of MgAl$_2$O$_4$ is 100 parts by weight.

Also preferably, the total content of C, N, F, S and P in the sintered body is less than 100 ppm. Often, C and N are contained in organic additives such as binder. Therefore, in the practice of the invention, preferably the molding step is necessarily followed by binder burnout in air or oxygen atmosphere at 800° C. or higher to completely decompose and remove C and N. In some cases, S and P are contained in certain organic dispersants. Therefore, in the practice of the invention, preferably an organic additive containing S and/or P is never used. F is contained as the constituent of some fluoride-base sintering aids (e.g., LiF, NaF, KF). Therefore, in the practice of the invention, preferably a fluoride-base sintering aid is never added.

With the above construction, a UV-transmissive transparent spinel sintered body is obtained wherein a sample of the sintered body having a thickness of 3 mm, taken in thickness direction, is not absorptive and has an overall light transmittance of at least 80% in the full wavelength range of from 190 nm to 400 nm, inclusive of the UV-C region. The phrase that a sample "has an overall light transmittance of at least 80% in the full wavelength range of from 190 nm to 400 nm" means that the overall light transmittance is at least 80% at any wavelength in that wavelength range. The transparent spinel sintered body of the invention may be utilized as a UV light-transmitting member for use with UV-LEDs and become a UV light-transmitting member satisfactory as any application members.

The inventive transparent spinel sintered body is not absorptive in the full UV wavelength range of from 190 nm and up to 400 nm wavelength, and a sample of the sintered body with a thickness of 3 mm, taken in thickness direction, has an overall light transmittance of at least 80% in the range. The sintered body may be directly bonded to a UV chip with an inorganic oxide adhesive having UV resistance. There is provided a UV light-transmitting member of industrially acceptable high level for use with UV-LEDs, which is free of a heterogeneous phase containing a birefringent component, and has a thermal conductivity in excess of 10 W/m·K and a refractive index in the range of from 1.7 to 2.0 at wavelength 190 to 400 nm.

Using the transparent spinel sintered body of the invention, there is provided an optical member comprising the transparent spinel sintered body, the optical member being disposed on the emergent side of a UV light-emitting chip capable of emitting light of wavelength up to 400 nm and serving as a medium for transmitting light from the UV light-emitting chip.

In this embodiment, the UV light-emitting chip is preferably a UV light-emitting diode chip capable of emitting light in at least any one wavelength region selected from the UV-A region of wavelength 315 to 400 nm, the UV-B region of wavelength 280 to 315 nm, and the UV-C region of wavelength 100 to 280 nm.

Since the inventive transparent spinel sintered body is a general oxide, it is effectively bondable to many inorganic oxides such as $SiO_2$, $Al_2O_3$, $B_2O_3$, CaO, MgO and PbO. For example, the optical member comprising the transparent spinel sintered body may be disposed by bonding it to a sapphire or AN substrate of the UV light-emitting chip (UV-LED chip) with an inorganic oxide adhesive. When the inorganic oxide adhesive is formed to a certain thickness, it may be an encapsulation layer on the UV light-emitting chip.

Unlike single crystals, the inventive transparent spinel sintered body is a transparent body obtained by sintering a compact. When compacts of various different shapes are previously formed, they are suitable for providing UV-transmitting optical members of various final shapes. Although such near-net-shape sintering technique is, of course, possible, the sintered body may be finished into the desired shape by post-working.

When the optical member is disposed on the emergent side of the UV light-emitting chip as described above, an emergent surface where light transmitted by the optical member emerges has any one of a spherical or aspheric lens shape, an array structure having spherical or aspheric lenses disposed in array, a texture structure consisting of microscopic irregularities or microscopic pyramids, and various other photonic shapes.

The inventive transparent spinel sintered body may be utilized as a member, window, support, guide, light condensing member, flow path part or substrate which transmits UV light and is utilized as a structural member, among application products utilizing UV light irradiation as part of their function.

[Method for Preparing Transparent Spinel Sintered Body]

The method for preparing a transparent spinel sintered body according to the invention is described in detail. The method for preparing a transparent spinel sintered body is a so-called ceramic preparation method.

[Source Powder]

The source powder used herein is one obtained by subjecting a starting raw material composed of preselected main components to the predetermined treatments. As the starting raw material, a spinel ($MgAl_2O_4$) (i.e., Mg—Al spinel powder), or an oxide powder consisting of equimolar amounts of alumina (i.e., aluminum oxide ($Al_2O_3$)) and magnesia (i.e., magnesium oxide (MgO)), or a precursor thereto, alkoxide or carbon dioxide may be preferably used. Of these, the oxide powder is preferable because it is stable and safe and thus easy to handle. These raw materials should have a purity of at least 99.99% by weight (4N).

The particle shape of the starting raw material is not particularly limited. For example, particles of angular, spherical and plate shape are advantageously used. Even a powder of secondary agglomerates may be effectively used, and a granular powder obtained by granulating treatment such as spray drying may also be effectively used. The method for preparing the starting raw material is not particularly limited. A powder prepared by co-precipitation, grinding, spray pyrolysis, sol-gel, alkoxide hydrolysis, or any other synthesis techniques may be advantageously used. Among others, it is most preferred to use as the starting raw material a spinel fine powder which is obtained by preparing a hydroxide by the co-precipitation technique of reacting salts of aluminum and magnesium with ammonium hydrogencarbonate and precipitating, and firing the hydroxide for oxidation. The starting raw material thus obtained in powder form may be further treated on a wet ball mill, bead mill, jet mill, dry jet mill, hammer mill or the like.

As mentioned above, an Mg—Al spinel powder having an Al/Mg ratio of 1.97 to 2.03 is used, or a mixture obtained by weighing powders of Mg oxide and Al oxide so as to give an Al/Mg ratio of 1.97 to 2.03 is used. At this point, the weighing step aiming at an Al/Mg ratio of 2.00 is preferred.

The starting raw material may be fired or calcined in a crucible after weighing and dispersion treatment if it is a Mg—Al spinel ($MgAl_2O_4$) powder or after weighing and mixing if it is a combination of Al oxide ($Al_2O_3$) powder and Mg oxide (MgO) powder, whereby a fired or calcined raw material is prepared. This treatment is referred to as firing or calcining treatment. Thereafter, the fired raw material is ground into a source powder. The temperature of the firing treatment is preferably 700 to 950° C. for a $MgAl_2O_4$ powder or 800 to 1,100° C. for an equimolar mixed raw material of $Al_2O_3$ powder and MgO powder.

Various organic additives may be added to the source powder used herein for the purposes of quality stabilization in the manufacture steps and increasing the yield. In the practice of the invention, there may be added only those organic polymeric additives consisting of C, O, H and N components which can be completely burned and/or decomposed off in the burnout step. As long as the above conditions are met, any of various dispersants, defoamers, binders, lubricants and plasticizers may be effectively used.

It is preferred that sintering aids of any inorganic compounds such as metal fluorides, metal nitrides, metal sulfides, metal carbides and metal phosphates are never added. The complete omission of these sintering aids makes it possible to manage the precipitation of a heterogeneous phase other than oxides to a range below the level corresponding to the balance of purity 4N of the starting raw materials, that is, below 100 ppm, and to prevent precipitation of a heterogeneous phase causing birefringence or scattering in the full UV wavelength range of wavelength 190 nm and longer. That is, preferably the total content of metals (impurity metals) exclusive of Mg and Al in the sintered body is below 100 ppm, and the total content of C, N, F, S and P is below 100 ppm.

Notably, it is generally difficult to transparentize a polycrystalline sintered body without adding any sintering aids. In the practice of the invention, to solve this problem, the source powder which is used for the preparation of the transparent spinel sintered body of the invention is prepared by prescribing the specifications of the starting raw material as below, and subjecting the starting raw material to the predetermined treatment.

(Preparation of Source Powder)

First of all, the predetermined starting raw material is prepared. The preferred starting raw material is a powdered raw material which is free of coarse primary particles having a particle size of at least 500 nm, preferably at least 400 nm and hard aggregate particles having a particle size of the same value, which has a specific surface area (BET specific surface area) of from 10 $m^2/g$ to 25 $m^2/g$ as measured by the BET method, and which is prepared such that fine primary particles of less than 20 nm are removed to the utmost and/or the entrainment of fine primary particles of less than 20 nm (inclusive of particles to form fine particles of that particle size) is suppressed. Such starting raw material in powder form may be a powdered raw material having a BET specific surface area of from 10 $m^2/g$ to 25 $m^2/g$, and typically an average particle size of primary particles (average primary particle size) of around 100 nm, for example, an average primary particle size of 80 to 200 nm, preferably 80 to 150 nm, more preferably 90 to 120 nm. It is noted that the average particle size is determined as a weight average value (or median diameter) by the laser light diffraction method, or an average value of length measurements by SEM observation. Inter alia, a weight average value by the laser light diffraction method is preferably used as the average particle size.

This is true independent of whether a $MgAl_2O_4$ powder raw material or a mixed raw material of $Al_2O_3$ powder and MgO powder is used as the starting raw material. In the embodiment wherein the mixed raw material is prepared by dispersing and mixing $Al_2O_3$ powder and MgO powder, the dispersing and mixing conditions in a ball mill unit are carefully controlled so as not to generate fine particles of less than 20 nm.

Next, as the other important condition for transparentizing a polycrystalline sintered body without adding any sintering aids, the starting raw material is subjected to at least one firing treatment. In general, for the purchased starting raw material, a progress of tight agglomeration due to moisture during storage is found. If such raw material is directly fed to the compact molding step, a green compact after molding and before sintering has a noticeable distribution of loose and dense areas in its interior, leading to the outstanding generation of crevice-like devitrification or cluster-like bubble clouds. Thus, an oxide powder like the raw material used herein must have been subjected to at least one firing treatment in an oxygen-containing atmosphere (e.g., oxygen, air, or a mixture of inert gas and oxygen), for completing dehydration, reducing the surface area of primary particles and necking composite particles, and improving the crystallinity of particles.

Since there exists no fixed solution to the firing temperature (i.e., the predetermined temperature does not exist), the firing temperature must be adjusted as appropriate by taking into account the value of specific surface area as measured from SEM photograph or by the BET method (BET specific surface area) before and after the firing treatment. For the starting raw material powder, the firing temperature is equal to or higher than the temperature necessary for achieving dehydration, reducing the surface area of primary particles and necking composite particles, and improving the crystallinity of particles, and lower than the undesired particle-generating temperature for preventing generation of coarse grown particles having a particle size of at least 500 nm and particle aggregates.

In general, when the starting raw material having the same composition as the final composition like $MgAl_2O_4$ powder is fired, the firing temperature may be selected in a relatively low range. When the final composition is reached by sintering reaction as is the case with the mixed raw material of $Al_2O_3$ powder and MgO powder, the firing temperature may be set at a relatively high level.

Specifically, for the $MgAl_2O_4$ powder which is controlled to the particle size and BET specific surface area in the above-defined ranges, the firing temperature is preferably 700 to 950° C. For the mixed raw material of $Al_2O_3$ powder and MgO powder which is controlled in the same ranges, the firing temperature is preferably 800 to 1,100° C.

After the firing treatment, the treated particles (starting raw material powder as fired) are subjected to wet or dry grinding treatment again on a ball mill device or the like, obtaining a source powder which is free of robust aggregates and readily disintegrable. At this point, the grinding conditions (including bead diameter, total amount of powder fed, and treating time on the ball mill device) may be set so as to prevent ultrafine particles having a particle size of less than 20 nm from being generated by over-grinding.

The foregoing treatment results in a source powder in which coarse primary particles having a reduced BET specific surface area of 10 to 14 $m^2/g$ and a particle size of at least 500 nm, and hard aggregates of the same or larger size are absent, and the entrainment of fine primary particles having a size of less than 20 nm is minimized. If necessary, the source powder may be spray dried into a granular source.

[Preparation Method]

According to the invention, a sintered body which is consolidated to a relative density of 95% or higher at the lowest is prepared by using the source powder, pressure molding the source powder into a compact of predetermined shape, effecting binder burnout, and sintering the compact. As the post-treatment, hot isostatic pressing (HIP) treatment is preferably carried out.

(Molding)

In the preparation method of the invention, a conventional press molding step may be advantageously used. Specifically, common steps may be used, including the pressing step of filling a mold with the source powder and pressing the powder in one direction, and the cold isostatic pressing (CIP) step of filling a deformable water-proof container with the source powder, sealing the container, and applying isostatic pressure. The applied pressure may be adjusted as appropriate while monitoring the relative density of the resulting compact. The applied pressure, though not critical, is preferably kept in a pressure range of up to about 300 MPa, with which commercial CIP devices comply, for example, because the manufacture cost is reduced. Alternatively, the hot press step capable of performing not only the molding step, but also the sintering step straightly, the discharge plasma sintering step, or the microwave heating step may be advantageously utilized. Further, it is possible to prepare a compact by the slip casting method rather than the press molding method. Another molding method such as pressure casting, centrifugal casting or extrusion molding method may also be employed as long as the shape and size of oxide powder as the starting raw material and its combination with various organic additives are optimized.

(Binder Burnout)

In the preparation method of the invention, a conventional binder burnout step may be advantageously utilized. Specifically, a heating binder burnout step in a heating oven is possible. Although the type of atmosphere gas is not particularly limited, air, oxygen or an inert gas in admixture with oxygen may be utilized. Since the compact is oxide, the oxygen atmosphere is most preferred.

(Sintering)

In the preparation method of the invention, a conventional sintering step may be advantageously utilized. Specifically, a heat sintering step such as by resistance heating or induction heating may be advantageously utilized. Although the atmosphere is not particularly limited, an inert gas, oxygen, hydrogen or vacuum may be utilized. Since the sintered body is oxide, the oxygen atmosphere is most preferred.

The sintering temperature in the sintering step is adjusted as appropriate depending on the starting raw material selected. In general, once the temperature at which consolidation takes place to the maximum when the starting raw material selected is sintered, or a temperature higher than that temperature by several tens of degrees Celsius is determined, preferably sintering is effected by holding the compact at the temperature because consolidation is promoted thereby. For the transparent spinel sintered body of the invention, the sintering temperature is preferably in a range of from 1,350° C. to 1,550° C.

In general, the holding time during sintering is adjusted as appropriate depending on the starting raw material selected. Although several hours is sufficient in most cases, holding for several tens of hours is equivalently acceptable. At the end of the sintering step, the sintered body must have been consolidated to a relative density of 95% or higher at the lowest.

In order that the inventive transparent spinel sintered body be used as a UV light-transmitting member for UV-LEDs, the sintered body must have an overall light transmittance of at least 80% at a thickness of 3 mm in the full wavelength range of from 190 nm to 400 nm including the UV-C region. To prepare the sintered body as a transparent body of this grade, the sintered body is preferably further subjected to HIP treatment. By this treatment, the amount of residual bubbles within the sintered body is reduced to 0.2% by volume or less. As the secondary effect, a thermal conductivity of more than 10 W/m·k, preferably at least 14 W/m·k is available.

Notably, it is rather preferred as the member for some applied products that residual bubbles are intentionally retained as long as the amount of residual bubbles is up to 0.2% by volume, for the reason that if the size and distribution of bubbles are controllable, light of wavelengths in the UV region can be properly scattered without absorption.

(Hot Isostatic Pressing (HIP))

In the inventive preparation method, the step of hot isostatic pressing (HIP) may be added at the end of the sintering step.

The type of pressure gas medium used herein is preferably selected from inert gases such as argon and nitrogen, and Ar—$O_2$. The pressure applied by the pressure gas medium is preferably 50 to 300 MPa, more preferably 100 to 300 MPa. If the pressure is less than 50 MPa, no transparency improving effect may be obtained. If the pressure exceeds 300 MPa, no further transparency improvement is obtained from an increment of pressure and an excessive load may be imposed to the device to cause damages. It is convenient and preferable that the applied pressure is up to 196 MPa, with which commercial HIP devices comply.

The temperature (holding temperature) of the HIP treatment may be selected as appropriate depending on the sintered state of spinel, for example, in a range of 1,350 to 1,900° C., preferably 1,400 to 1,650° C. Even when the heat treatment temperature is higher than 1,900° C. and up to 2,300° C., the HIP treatment is possible, but its management is difficult because grain growth runaway can occur unless the density of the sintered body prior to the treatment is adjusted as appropriate. Such high temperatures are less preferable because the risk of degrading the heater material and heat insulating material of the device increases.

The heater material, heat insulating material, and container used in the HIP treatment are preferably made of graphite, molybdenum (Mo), platinum (Pt) or tungsten (W), though not limited thereto.

(Annealing)

In the inventive preparation method, the resulting transparent spinel sintered body may give a pale gray appearance as a result of oxygen defects forming after the completion of the HIP treatment. In such cases, annealing treatment is preferably carried out at or below the HIP treatment temperature, for example, at 800 to 1,500° C.

Preferably the atmosphere gas and pressure of the annealing treatment are adjusted as appropriate. Vacuum, Ar, $H_2$, $N_2$ or $O_2$, and a pressurizing environment thereof (reduced pressure environment in the case of vacuum) are preferably selected.

(Machining)

In the inventive preparation method, the transparent spinel sintered body resulting from the series of steps as mentioned above is machined to any desired shape, size and thickness and becomes ready for use as window members for UV-LEDs, supports, guide parts, light condensing members, flow path parts, and substrates, which are contemplated herein of use.

The foregoing steps yield a UV light-transmissive, transparent spinel sintered body, which is used in applied products that utilize UV light irradiation as part of their function.

EXAMPLES

Examples and Comparative Examples are given below for further illustrating the invention, but the invention is not limited thereto.

Example 1

Of transparent spinel sintered bodies within the scope of the invention, those using $MgAl_2O_4$ powder as the starting raw material are described.

As the starting raw material, a spinel powder was purchased from Taimei Chemicals Co., Ltd., which had a purity of at least 99.99% by weight (designated 4N-$MgAl_2O_4$). The spinel powder had a specific surface area of 19 $m^2/g$ as measured by the BET method and an average primary particle size (weight average value by the laser light diffraction method) of 100 nm. No coarse primary particles having a particle size of 400 nm or greater were contained because disintegration treatment was carried out at the time of shipping from the supplier. Few ultrafine primary particles of less than 20 nm were entrained at the time of shipping from the supplier.

As the aid and additive used in Comparative Examples, LiF powder, $MgF_2$ powder and $AlF_3.xH_2O$ powder were purchased from Alfa Aesar. They had a purity of at least 99.99% by weight.

Using these raw materials, a raw material of Example and three raw materials of Comparative Examples were prepared as the starting raw material as shown in Table 1. Notably, the content of S added was calculated from the proportion of S in ammonium dodecylbenzenesulfonate dispersant.

TABLE 1

| | Raw material (main component) | Sintering aid | Additive |
|---|---|---|---|
| Example 1-1 | 4N-MgAl$_2$O$_4$ | nil | nil |
| Comparative Example 1-1 | 4N-MgAl$_2$O$_4$ | LiF, 0.1 mass % (1,000 ppm) | nil |
| Comparative Example 1-2 | 4N-MgAl$_2$O$_4$ | MgF$_2$ and AlF$_3$, each 0.1 mass % (1,000 ppm) | nil |
| Comparative Example 1-3 | 4N-MgAl$_2$O$_4$ | nil | ammonium dodecylbenzenesulfonate dispersant, 0.5 mass %; S content 0.2 mass % (2,000 ppm) |

Subsequently, each of the starting raw materials was subjected to dispersing and mixing treatment in ethanol on a ball mill device of alumina while carefully operating so as to avoid intermixing of materials. The treatment time was 10 hours. Thereafter, the slurry was dried, and the resulting powder of the starting raw material was subjected to firing treatment in an oxygen atmosphere at 700 to 950° C. The powder was again subjected to dispersing and mixing treatment in ethanol on a ball mill device of alumina while carefully operating so as to avoid intermixing. The treatment time was 20 hours. Of the slurries thus obtained, a portion of the slurry of Example 1-1 was evaporated to dryness on an evaporator, obtaining a dry powder for particle size determination. Each of the remaining slurries was finished, through spray dry treatment, into a granular raw material having an average particle size of 20 μm.

FIG. 1 is a photomicrograph (SEM image) of the source powder which was sampled out of Example 1-1 and evaporated to dryness, that is, the source powder obtained by firing and grinding the starting raw material. As seen from FIG. 1, the source powder consisted of particles having a particle size of the order of 30 to 300 nm. That is, it was confirmed that as long as the upper limit of the firing treatment temperature was within the above-defined range, the formation of coarse grown particles having a particle size of 500 nm or larger and aggregated coalescent particles was suppressed. On measurement of specific surface area by the BET method, the surface area of the source powder was reduced to 10-14 m$^2$/g. Further, a precise observation of the photomicrograph revealed that the formation of ultrafine particles of less than 20 nm due to over-grinding was substantially avoided. This was established by using beads of diameter 2 mm or less during the dispersing and mixing treatment on the ball mill device after the firing treatment, keeping the total amount of beads to or below the lower limit of volume below which the particles to be treated were immersed in ethanol, and keeping the treatment time within 25 hours.

Next, for each of the granular raw materials, there were furnished a mold having a diameter of 8 mm combined with one punch having a mirror finished concave surface, which was filled with the raw material until the stuffed raw material has a vertical long form, another mold having a diameter of 35 mm which was filled with the raw material in thin plate form, and a further mold having a diameter of 65 mm which was filled with the raw material in thin plate form. Using a uniaxial press molding machine, the charges were temporarily molded into a bulb of diameter 8 mm and length 8 mm, a disk of diameter 35 mm and thickness 3 mm, and a disk of diameter 65 mm and thickness 4 mm. This was followed by isostatic pressing treatment under a pressure of 198 MPa, yielding a CIP compact. The compact was subjected to binder burnout treatment in a muffle furnace at 500 to 1,000° C. for 2 hours. Subsequently, the dry compact was placed in an atmospheric furnace of resistance heating type where it was treated in oxygen atmosphere at 1,350 to 1,550° C. for 3 to 20 hours. There were obtained twelve sintered bodies in total. The sintering temperature was adjusted so that all sintered samples had a relative density of 95%.

Each of the sintered bodies thus obtained was placed in a HIP furnace with carbon heater where it was HIP treated in Ar under conditions: 200 MPa, 1,400-1,650° C., 2 hours.

Each of the ceramic sintered bodies thus obtained was lightly polished on the surface, yielding a structural member of transparent spinel sintered body. With respect to their size, the bulb samples had a bulb lens shape of diameter 6 mm and length 6 mm, the small disk samples had a substrate shape of diameter 25 mm and thickness 2 mm, and the large disk samples had a substrate shape of diameter 50 mm and thickness 3 mm.

Of the sintered bodies thus obtained, the sintered bodies of bulb lens shape were simply used as a geometrical sample to inspect the outer appearance, whereas the substrate-shape sintered bodies of diameter 50 mm and 25 mm were used for normal evaluation.

(Method for Measuring Overall Light Transmittance)

The substrate-shape sintered bodies of Example and Comparative Examples were determined for overall light transmittance in the UV wavelength region of 190 to 400 nm by the following procedure using a spectrometer (model V-670 by JASCO Corp.)

The overall light transmittance is evaluated by summation calculating overall light rays transmitted by a sample inclusive of forward scattering components, specifically by condensing light by means of an integrating sphere. The procedure involves first condensing light in the wavelength band of 190 to 400 nm by means of an integrating sphere in the blank state without resting the sample, thereby obtaining a value of base light quantity $I_0$ at every wavelength. Then the sample is placed in the optical path. All light rays transmitted by the sample in the wavelength band of 190 to 400 nm (specifically each wavelength of 190, 280, 315 and 400 nm) are condensed by the integrating sphere, obtaining a value of light quantity I at every wavelength. The overall light transmittance is computed by the following equation.

$$\text{Overall light transmittance} = I/I_0 \times 100$$

(Observation of Birefringent Scattering State)

Subsequently, the same sample was observed for grain boundary under a polarizing microscope (Zeiss) at a magnification of ×100. By checking whether or not the grain boundary is observed as a cloudy obscure image due to birefringence under the open nicol microscope, the birefringent scattering state of each of Example and Comparative Example samples was judged. Namely, the sample is rated OK when the cloudy obscure image is not observed and NG when the cloudy obscure image is observed.

(Method for Measuring Thermal Conductivity)

Next, the substrate-shape sintered bodies of diameter 25 mm in Example and Comparative Examples were used to measure a thermal conductivity.

The thermal conductivity λ (W/m·K) of a sample is computed according to the following equation as the product of density ρ (kg/m³), specific heat Cp (J/kg·K) and thermal diffusivity α (m²/s).

$$\text{Thermal conductivity } \lambda = \alpha \rho C_p$$

The density is determined by the Archimedes' method; specific heat by the differential scanning calorimetry (DSC) using a differential scanning colorimeter Pyris 1 DSC of Perkin Elmer; thermal diffusivity by the laser flash method using LFA447 of Netzsch.

(Steel Ball Drop Test)

Next, the sintered bodies of diameter 50 mm in Example and Comparative Examples were examined by the steel ball drop test to inspect fracture.

A steel ball of weight 110 g was dropped under gravity from the vertical height of 1 m and impacted against the sintered body. The sintered body was evaluated by visually observing whether or not impact fracture occurred.

The sample is rated OK when no fracture is observed and NG when fracture is observed.

(Method for Measuring Refractive Index)

The sample of diameter 25 mm in Example 1-1 was measured for refractive index in the range of wavelength 190 to 400 nm.

The refractive index was determined by using a high-speed spectroscopic ellipsometer M-2000 of rotational compensator type (J.A. Woollam), measuring changes of polarization of reflected light, and calculating optical constants using analysis software (fitting method).

Figure 2:
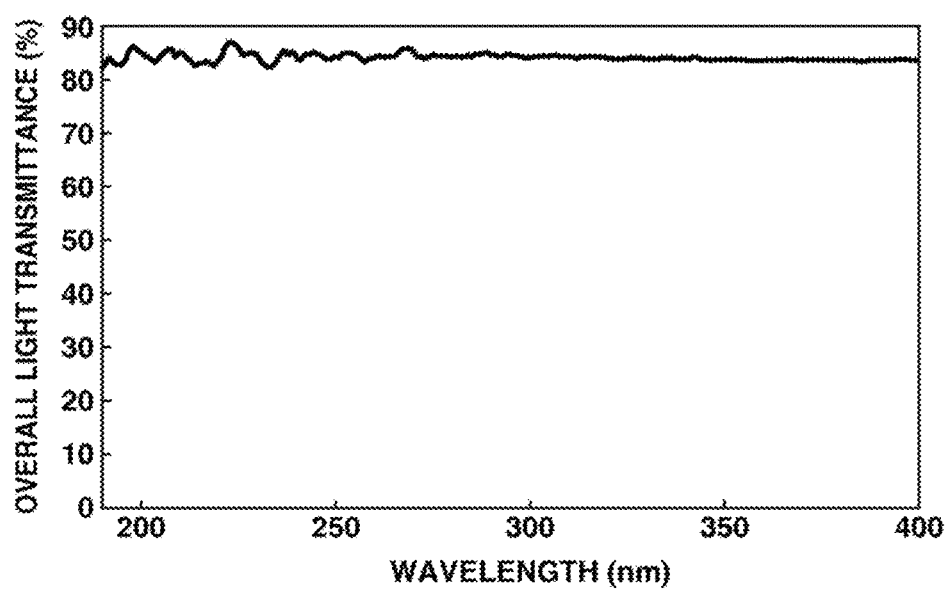
FIG. 2 is a diagram showing the measurement results of overall light transmittance of the spinel sintered body in Example 1-1.
Figure 3:
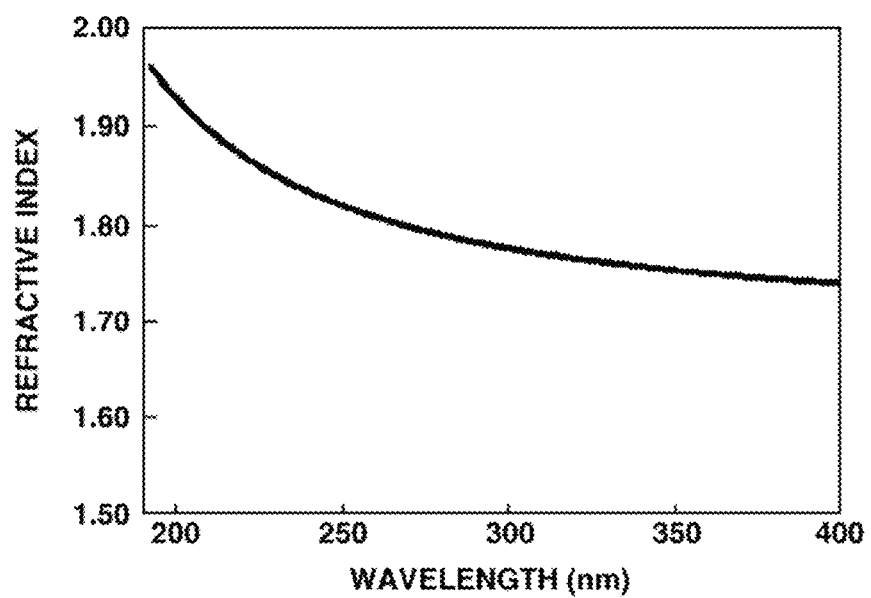
FIG. 3 is a diagram showing the measurement results of refractive index of the spinel sintered body in Example 1-1.

The results of the series of tests are tabulated in Table 2. FIG. 2 shows the measurement results of overall light transmittance of Example 1-1 and FIG. 3 shows the measurement results of refractive index of Example 1-1 as a representative.

From the results of preparation in Example, it is confirmed that plate-shape window members and bulb lens shape window members can be manufactured. Since the transparent spinel sintered body of the invention is a ceramic sintered body, needless to say, it can be finished to any of various other shapes.

The sample of Example had a refractive index of from 1.73 to 1.97 as measured at wavelength 190 to 400 nm. These values of refractive index indicate that the refractive index of the inventive transparent spinel sintered body in the UV wavelength region is lower than the refractive index of commercial UV-LED chips (for example, about 3.0 at 250 nm, 2.5 at 280 nm, 2.4 at 315 nm, and 2.3 at 400 nm), and approximately equal to the refractive index of sapphire which is often used as substrates. It is confirmed from these data that when the transparent spinel sintered body is directly bonded to a UV-LED chip via a $SiO_2$ bond film having UV resistance, made of Shin-Etsu Chemical Co., Ltd., for example, the sintered body functions as a lens material which is improved in external extraction efficiency while suppressing total reflection confinement.

It is seen from these results that using the inventive transparent spinel sintered body, a UV-transmissive member of the truly industrially acceptable level suited for use with UV-LEDs is obtained, which is not absorptive in the full UV wavelength range ranging from wavelength 190 nm to 400 nm and covering from UV-A to UV-C, has an overall light transmittance of at least 80%, is free of a birefringent

TABLE 2

|  | Transmittance (%) | | | | Birefringent state scattering | Thermal (W/m · K) conductivity | Steel ball drop |
| --- | --- | --- | --- | --- | --- | --- | --- |
|  | 190 nm | 280 nm | 315 nm | 400 nm | | | |
| Example 1-1 | 82 | 84 | 84 | 83 | OK | 14 | OK |
| Comparative Example 1-1 | <1 | 62 | 84 | 84 | NG | 10 | NG (powdered) |
| Comparative Example 1-2 | 74 | 83 | 84 | 84 | NG | 10 | NG (powdered) |
| Comparative Example 1-3 | 77 | 82 | 83 | 87 | NG | 7 | NG (cracked) |

As seen from the above results, in the group of Comparative Examples in which the sintering aid or the dispersant containing substantially nonvolatile component (S) was added, the overall light transmittance in the UV-C region lowered below 80%. In Example in which 4N raw material was used and no additives were intentionally added, there was finished the UV-transmissive sintered body which was truly transparent in that the overall light transmittance was higher than 80% in the full wavelength region from UV-A to UV-C.

In the microscopic observation of birefringence, only Example offers uniform satisfactory optical quality receiving no impact of grain boundary. Comparative Examples were finished to the birefringent component-contaminated state in which the grain boundary was observed as a cloudy image.

Further, in the steel ball drop test, only Example passed whereas Comparative Examples were more or less broken.

component, is suited for direct bonding with an inorganic oxide adhesive, and has impact resistance and a satisfactory thermal conductivity.

The sample (spinel sintered body sample) of Example 1-1 after the evaluation was further analyzed for impurity content therein by the glow discharge mass spectrometry (GDMS). The results are shown in Table 3. In Table 3, "<" indicates below the detection limit, and "≤" indicates that an element detrimental to the measurement of an objective element is present, and the peak thereof overlaps the peak of measurement, but is equal to or below the indicated value.

As a result, the total content of metal impurities (K, Na, Ca, Li, Ti, Cr, Mn, Fe, Co, Ni, Cu, Zn, Zr, Sn, Ba, Pb) exclusive of Al and Mg was less than 92.24 ppm by weight. The total content of F, P and S was less than 7.8 ppm by weight.

TABLE 3

(unit: wt ppm)

| Element | B | F | P | S | K | Na | Ca | Li | Ti | Cr |
|---|---|---|---|---|---|---|---|---|---|---|
| Measured value | <0.05 | <1 | 6.3 | <0.5 | <1.4 | 62 | 7.8 | 5.7 | 0.18 | 1.5 |
| Element | Mn | Fe | Co | Ni | Cu | Zn | Zr | Sn | Ba | Pb |
| Measured value | 2.1 | 3.9 | 0.13 | 0.37 | <1 | 4.9 | 0.16 | <0.5 | <0.1 | <0.5 |

Example 2

Of transparent spinel sintered bodies within the scope of the invention, those using a mixed raw material of $Al_2O_3$ powder and MgO powder as the starting raw material are described.

As the starting raw material, alumina powder and magnesia powder were purchased from Taimei Chemicals Co., Ltd. and Ube Materials Co., Ltd., respectively. The alumina powder had a purity of at least 99.99% by weight and the magnesia powder had a purity of at least 99.995% by weight.

The alumina and magnesia powders had a specific surface area of 15 $m^2/g$ and 8 $m^2/g$ as measured by the BET method and an average primary particle size (weight average value by the laser light diffraction method) of 100 nm and 200 nm, respectively. Neither coarse primary particles having a particle size of at least 500 nm nor particle aggregates having the same size or greater were contained. Few ultrafine primary particles of less than 20 nm were entrained at the time of shipping from the suppliers.

From these raw materials (main component raw materials), a starting raw material of Example was prepared without adding the sintering aid, dispersant and other additives.

Specifically, the starting raw material was subjected to dispersing and mixing treatment in ethanol on a ball mill device of alumina. The treatment time was 15 hours. Thereafter, the slurry was dried, and the resulting mix powder was subjected to firing treatment at 950° C. The powder was again subjected to dispersing and mixing treatment in ethanol on a ball mill device of alumina. The treatment time was 20 hours. The slurry was finished, through spray dry treatment, into a granular raw material having an average particle size of 20 μm.

Setting of the firing treatment temperature as above prevents the particle size of the partially spinel-converted source powder from particle growth to 500 nm or greater. By the firing treatment and subsequent dispersing and mixing treatment, the specific surface area of the source powder was reduced to a range of 10 to 12 $m^2/g$ as measured by the BET method. The formation of ultrafine particles of less than 20 nm due to over-grinding was substantially avoided by using beads of diameter 2 mm or less during the dispersing and mixing treatment on the ball mill device after the calcining treatment, keeping the total amount of beads to or below the lower limit of volume below which the particles to be treated were immersed in ethanol, and keeping the treatment time within 25 hours.

Next, there were furnished two molds, a mold having a diameter of 8 mm combined with a punch having a mirror finished concave surface and another mold having a diameter of 8 mm combined with a punch having a concave surface which was entirely emboss machined in submicron size. Each mold was filled with the granular raw material until the stuffed raw material has a vertical long form. Using a uniaxial press molding machine, the charge was temporarily molded into a bulb of thickness 8 mm. This was followed by isostatic pressing treatment under a pressure of 198 MPa, yielding a CIP compact. The compact was subjected to binder burnout treatment in a muffle furnace at 800° C. for 2 hours. Subsequently, the dry compact was placed in an atmospheric furnace of resistance heating type where it was treated in oxygen atmosphere at 1,350 to 1,550° C. for 3 to 20 hours, obtaining a sintered body. The sintering temperature was adjusted so that the sintered sample had a relative density of 95%.

Each of two sintered bodies thus obtained was placed in a HIP furnace with carbon heater where it was HIP treated in Ar under conditions: 200 MPa, 1,400-1,650° C., 2 hours.

Each of the ceramic sintered bodies thus obtained was lightly polished only on the flat end surface, yielding a structural member of transparent spinel sintered body. With respect to size, both the sintered bodies had a bulb lens shape of diameter 6 mm and length 6 mm.

The samples of two types were evaluated for optical performance by the following procedure. First, a LED chip of emission wavelength 365 nm was commercially purchased (NS365C-3SAA by Nitride Semiconductor Co., Ltd.). The chip was coated with a reflective film on the electrode side and composed of sapphire single crystal on the substrate side. The chip was set with the sapphire substrate at the top, each of the bulb shaped UV lenses of two types was rested thereon, and the amount of light emerging from the convex bulb side was condensed by an integrating sphere and compared. It is noted that the efficiency of extraction from the embossed lens shape sample is expressed as a relative value, provided that the efficiency of extraction from the bulb lens shape sample is unity (1). As a result, the efficiency of extraction from the bulb embossed lens shape sample was 1.2 times the efficiency of extraction from the bulb lens shape sample.

As is evident from the above results, the molding treatment capable of taking advantage of the properties of a ceramic sintered body and modifying a compact so as to improve its light extraction efficiency is possible. That is, using the transparent spinel sintered body of the invention, a UV-transmissive member devised to improve light extraction efficiency and suited for use with UV-LEDs is provided.

While the invention has been described in typical embodiments, the invention is not limited thereto. Various other embodiments, additions, modifications and deletions may occur to persons skilled in the art. All such embodiments fall within the spirit and scope of the invention as long as the effects and benefits of the invention are achieved.

The invention claimed is:

1. A transparent spinel sintered body which is formed from an Mg—Al spinel powder or a mixed powder of Mg oxide and Al oxide having an Al/Mg ratio of 1.97 to 2.03, wherein the total content of metal impurities excluding Al and Mg is less than 100 ppm, the total content of C, N, F, S and P is less than 100 ppm, and a sample of the sintered body with a thickness of 3 mm has an overall light transmittance in thickness direction of at least 80% in the full wavelength range of from 190 nm to 400 nm.

2. The transparent spinel sintered body of claim 1 which contains microbubbles capable of internally scattering incident ultraviolet light without absorption.

3. The transparent spinel sintered body of claim 1 which has a thermal conductivity in excess of 10 W/m·K.

4. The transparent spinel sintered body of claim 1 which has a refractive index of from 1.7 to 2.0 at wavelength 190 to 400 nm.

5. An optical member comprising the transparent spinel sintered body of claim 1, the optical member being disposed on the emergent side of a UV light-emitting chip capable of emitting light of wavelength up to 400 nm and serving as a medium for transmitting light from the UV light-emitting chip.

6. The optical member of claim 5 wherein the UV light-emitting chip is a UV light-emitting diode chip capable of emitting light in at least any one wavelength region selected from UV-A region of wavelength 315 to 400 nm, UV-B region of wavelength 280 to 315 nm, and UV-C region of wavelength 100 to 280 nm.

7. The optical member of claim 5 which is bonded to the UV light-emitting chip with an inorganic oxide adhesive.

8. The optical member of claim 1 wherein an emergent surface of the member for light to be transmitted has a spherical or aspheric lens shape, an array structure having spherical or aspheric lenses disposed in array, or a texture structure consisting of microscopic irregularities or microscopic pyramids.

9. A method for preparing the transparent spinel sintered body of claim 1, comprising the steps of:
furnishing as a starting raw material, an Mg—Al spinel powder or a mixed powder of Mg oxide and Al oxide having a purity of at least 4N, a BET specific surface area of 10 to 25 $m^2/g$, an average primary particle size of 80 to 200 nm, and an Al/Mg ratio of 1.97 to 2.03,
firing the starting raw material in an oxygen-containing atmosphere without adding a sintering aid to the raw material,
grinding the fired material into a source powder,
filling a mold with the source powder,
pressure molding the source powder into a compact, and sintering the compact.

10. The method of claim 9 wherein the firing temperature is 700 to 950° C. when the starting raw material is an Mg—Al spinel powder, or 800 to 1,100° C. when the starting raw material is a mixed powder of Mg oxide and Al oxide.

11. The method of claim 9 wherein the source powder after the firing and grinding steps has a BET specific surface area of 10 to 14 $m^2/g$.

12. The transparent spinel sintered body of claim 1 which does not contain a sintering aid.

13. The transparent spinel sintered body of claim 1 which contains $MgAl_2O_4$ type spinel cubic crystals as the major phase and does not contain a heterogeneous phase containing a birefringent component.

14. The transparent spinel sintered body of claim 1 which is formed from the Mg—Al spinel powder.

15. The transparent spinel sintered body of claim 1 which is formed from a $MgAl_2O_4$ powder.

16. The transparent spinel sintered body of claim 1 which is formed from the mixed powder of Mg oxide and Al oxide having an Al/Mg ratio of 1.97 or more and less than 2.018.

* * * * *